Figure 1:
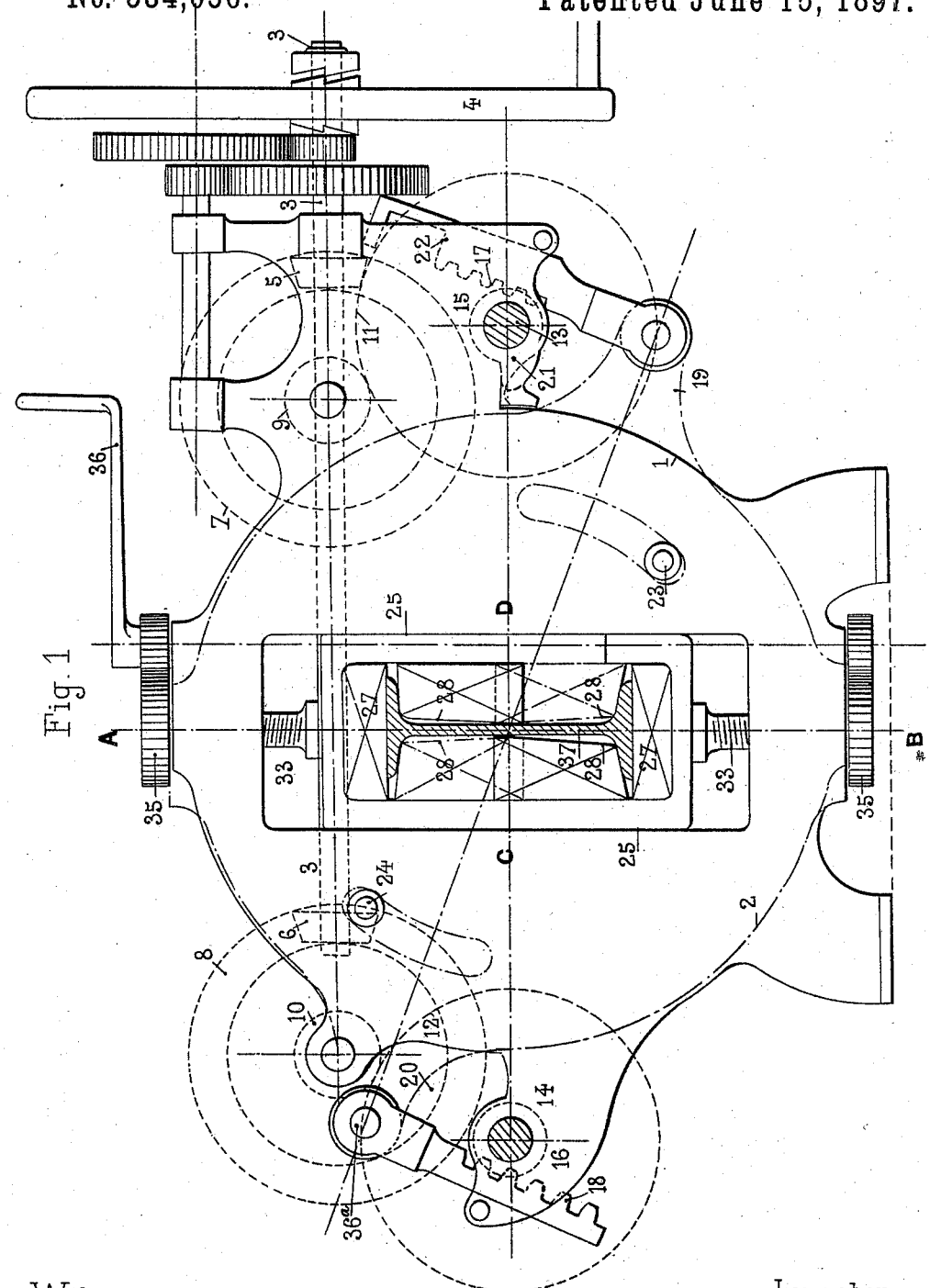

(No Model.) 2 Sheets—Sheet 1.

J. A. VERNET.
SHEARS FOR CUTTING METAL.

No. 584,656. Patented June 15, 1897.

Witnesses
Vinton Coombe
Robt Everett

Inventor
Joseph A. Vernet.
By James L. Norris
Atty.

(No Model.) 2 Sheets—Sheet 2.
J. A. VERNET.
SHEARS FOR CUTTING METAL.
No. 584,656. Patented June 15, 1897.
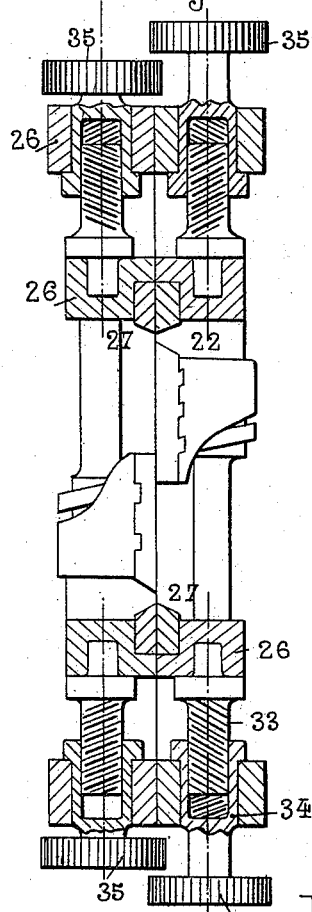
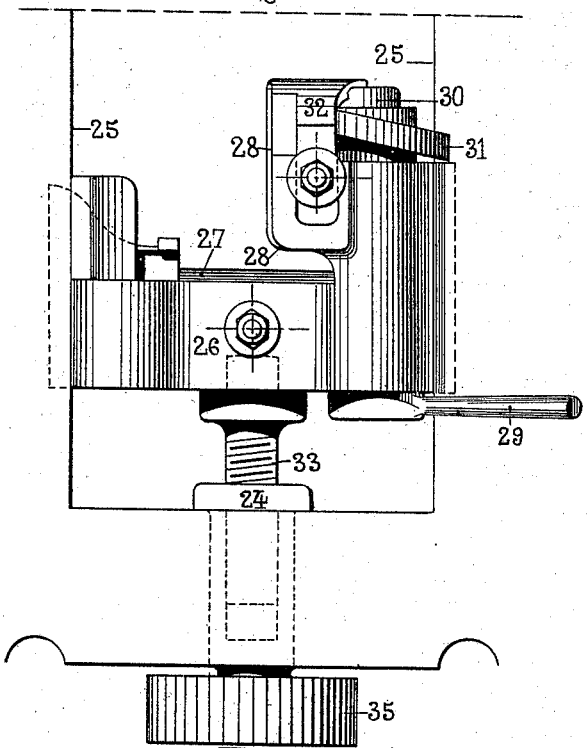
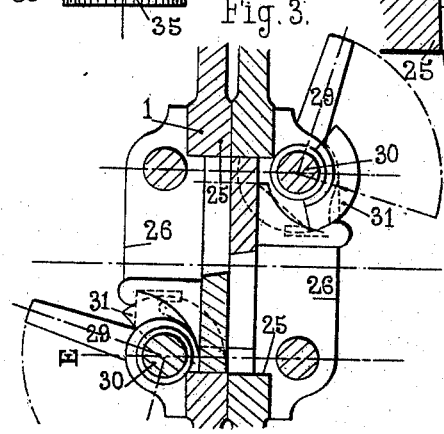
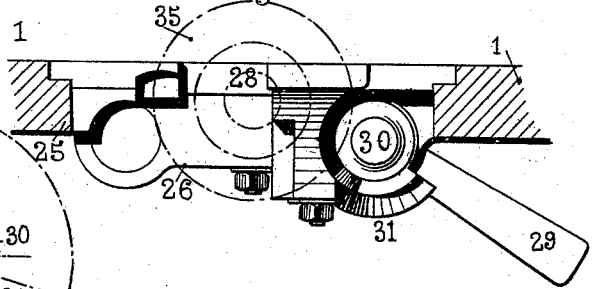
Witnesses
Vinton Coombe
Robert Emmett
Inventor
Joseph A. Vernet.
By James L. Norris
Atty.

UNITED STATES PATENT OFFICE.

JOSEPH ARTHUR VERNET, OF DIJON, FRANCE.

SHEARS FOR CUTTING METAL.

SPECIFICATION forming part of Letters Patent No. 584,656, dated June 15, 1897.

Application filed September 5, 1896. Serial No. 605,015. (No model.)

*To all whom it may concern:*

Be it known that I, JOSEPH ARTHUR VERNET, a citizen of France, and a resident of Dijon, in the Department of the Côte-d'Or, France, have invented a new and useful Improvement in Shears for Cutting Metal, of which the following is a specification.

My invention relates to apparatus for shearing girders and the like, and I will describe it with reference to the accompanying drawings, in which—

Figure 1 is a side elevation of a machine constructed in accordance with this invention. Fig. 2 is a vertical section taken on the line A B, Fig. 1. Fig. 3 is a part horizontal section taken on the line C D, Fig. 1. Figs. 4 and 5 show, respectively, in elevation and in plan one of the movable tool-carriers and its operating mechanism.

The machine has two coupled cheeks, the one, 1, fixed and the other, 2, movable. The outer contour of the latter is shown by the dotted lines in Fig. 1. The fixed cheek 1 carries the horizontal shaft 3, to which movement of rotation is given by means of the cranked fly-wheel 4 through a set of two speed-gears.

On the shaft 3 are secured two bevel-pinions 5 6, engaging with bevel-toothed wheels 7 8, which through the pinions 9 10 transmit movement to the toothed wheels 11 12, mounted on the shafts 13 14, carrying pinions 15 16, which engage with racks 17 18, centered to the projections 19 20 on the movable cheek 2.

The pinion 15, Fig. 1, is provided with a projection 21, capable of engaging with a notch 22 in the rack 17, so as to produce the vertical displacement of the movable cheek 2 in order to finish the shearing operation.

The cheek 2 is guided in its movement in relation to the cheek 1 by bolts 23 24 on the one cheek engaging in arc-shaped slots in the other cheek, and each cheek is pierced by a large opening between the vertical edges 25 25, in which slide two cutter-heads 26 26, one of which is shown separately and on a larger scale in Figs. 4 and 5. Each cutter-head is furnished with a horizontal blade 27 for shearing the flanges of the girder or the like from the outer sides and with a blade 28, moving vertically and serving to shear the body or rib of the girder or the like and the flanges from their inner sides.

The displacement of the blade 28 in relation to the cutter-head is obtained by operating the handle 29 on a vertical shaft 30, provided at its end with a helical cam 31, which engages on a groove of the same shape in the movable piece 32, carrying the blade 28.

The two cutter-heads joined to each of the cheeks 1 and 2 are moved from or brought toward one another (according to the height of the girder or the like to be cut) by means of the screw-threaded rods 33 33, working in nuts 34, actuated by the toothed wheels 35 through the crank 36.

In order to shear an I-shaped girder, it is first passed into the openings in the cheeks 1 and 2, and then the outer faces of the two flanges are firmly gripped between the blades 27 by operating the crank 36 to bring the cutter-heads toward each other. When this has been done, the handles 29 are successively turned in order to bring the four blades 28 into contact with the inner surfaces of the flanges, and so the girder is held between the blades 27 and 28 in the manner shown in Fig. 1. On turning the fly-wheel 4 the shafts 13 and 14 rotate, and the movable cheek 2 turns on the fixed cheek 1 and shears the girder by torsion. At the end of the movement the cam 21 engages in the notch 22 of the rack 17, and the effect of this is to impart to the movable cheek 2 a slight vertical displacement relatively to the fixed cheek 1, and to consequently shear the body or rib of the girder which was incompletely cut by the rotatory movement of the movable cheek.

The shearing operation of the cheeks is performed in two movements or stages. During the first stage (which lasts as long as the teeth of the pinion 15 are in mesh with the teeth of the rack 17) the cheek 2 merely revolves by itself about the common center of the two cheeks 1 and 2. When the last tooth of the rack 17 leaves the pinion 15, the second stage begins, during which the cheek 2 instead of turning around the common center referred to turns around the pivotal point 36ᵃ of the rack 18 at a small yet sufficiently large angle to shear the slight thickness of metal which remains after the first stage. This second stage of the movement is produced by the cam 21, carried by the pinion 5. At the end of the first stage of the movement this cam engages the opening 22 and causes the rack 17 to move downward with a speed greater than that previously imparted to it by the pinion. As the other pinion is not provided with a similar cam, the same increase of speed is not imparted to the pinion 18, and hence the cheek 2 moves about the pivotal point $36^a$ as a center and completes the shearing operation.

I do not limit myself strictly to the precise details described and shown, as it will be evident that they may be varied without departing from the nature of my invention.

Having now particularly described and ascertained the nature of my said invention and in what manner the same is to be performed, I declare that what I claim is—

1. In a machine for shearing girders and the like, the combination with a stationary and a rotatable cheek, both provided with cutting-blades, of oppositely-projecting racks tangentially attached to the opposite edges of the rotatable cheek, one of said racks being provided with a recess at its free end, pinions engaging said racks and operating to turn the rotatable cheek, a cam formed on the periphery of one of said pinions and operating to engage the said recess to impart an increased speed to the rack, and means for actuating said pinions, substantially as described and for the purpose specified.

2. In a machine for shearing girders and the like, the combination with a stationary and rotatable cheek having coincident apertures, of two vertically-movable and two horizontally-movable cutting-blades adjustably arranged in said apertures, means for adjusting said blades to cause them to grasp the article to be sheared, and means for turning said rotatable cheek axially and finally moving it transversely to its axis, substantially as described and for the purpose specified.

In testimony whereof I have signed this specification in the presence of two subscribing witnesses.

JOSEPH ARTHUR VERNET.

Witnesses:
GEORGES DELOM,
EDWARD P. MACLEAN.